US012357994B2

(12) United States Patent
Nagai et al.

(10) Patent No.: US 12,357,994 B2
(45) Date of Patent: Jul. 15, 2025

(54) PCR REACTION CONTAINER

(71) Applicants: NATIONAL INSTITUTE OF ADVANCED INDUSTRIAL SCIENCE AND TECHNOLOGY, Tokyo (JP); KYORIN PHARMACEUTICAL CO., LTD., Tokyo (JP)

(72) Inventors: Hidenori Nagai, Ikeda (JP); Shunsuke Furutani, Ikeda (JP); Hideyasu Kubo, Tokyo (JP)

(73) Assignees: NATIONAL INSTITUTE OF ADVANCED INDUSTRIAL SCIENCE AND TECHNOLOGY, Tokyo (JP); KYORIN PHARMACEUTICAL CO., LTD., Tokyo (JP)

( * ) Notice: Subject to any disclaimer, the term of this patent is extended or adjusted under 35 U.S.C. 154(b) by 894 days.

(21) Appl. No.: 17/270,848

(22) PCT Filed: Aug. 29, 2019

(86) PCT No.: PCT/JP2019/034008

§ 371 (c)(1),
(2) Date: Feb. 23, 2021

(87) PCT Pub. No.: WO2020/045591

PCT Pub. Date: Mar. 5, 2020

(65) Prior Publication Data

US 2021/0187510 A1 Jun. 24, 2021

(30) Foreign Application Priority Data

Aug. 30, 2018 (JP) ................................ 2018-161316

(51) Int. Cl.
*B01L 7/00* (2006.01)
*B01L 3/00* (2006.01)

(52) U.S. Cl.
CPC ........... *B01L 7/52* (2013.01); *B01L 3/502753* (2013.01); *B01L 2200/0689* (2013.01); *B01L 2300/0681* (2013.01); *B01L 2300/0832* (2013.01)

(58) Field of Classification Search
CPC ................ B01L 7/52; B01L 3/502753; B01L 2200/0689; B01L 2300/0681;
(Continued)

(56) References Cited

U.S. PATENT DOCUMENTS 6,273,478 B1 8/2001 Benett et al.
2003/0157503 A1 8/2003 McGarry et al.
(Continued)

FOREIGN PATENT DOCUMENTS

CN 107384776 A 11/2017
JP 2004-194652 A 7/2004
(Continued)

OTHER PUBLICATIONS

Japanese Patent Office, International Search Report in International Patent Application No. PCT/JP2019/034008 (Nov. 26, 2019).
(Continued)

*Primary Examiner* — Jill A Warden
*Assistant Examiner* — Jacqueline Brazin
(74) *Attorney, Agent, or Firm* — Leydig, Voit & Mayer, Ltd.

(57) ABSTRACT

A PCR vessel having:
a substrate,
a flow channel formed in the substrate,
a pair of filters provided at both ends of the flow channel,
a pair of air communication ports communicating with the flow channel through the filters,
(Continued)

a thermal cycle region formed between the pair of filters in the flow channel, and
a sample injection port through which a sample can be injected into the flow channel from above;
wherein the sample injection port in the surface of the substrate has an area of 0.7 to 1.8 $mm^2$.

14 Claims, 3 Drawing Sheets

Specification includes a Sequence Listing.

(58) Field of Classification Search
CPC ....... B01L 2300/0832; B01L 3/502723; B01L 2200/027; B01L 2200/0605; B01L 2200/141; B01L 2300/044; B01L 2300/0816; B01L 2300/0883; B01L 2300/0887; B01L 2400/0487; B01L 3/5027; B01L 7/525
USPC ........................................................ 435/287.2
See application file for complete search history.

(56) References Cited

U.S. PATENT DOCUMENTS

| | | | | |
|---|---|---|---|---|
| 2009/0123961 | A1 * | 5/2009 | Meyvantsson | B01L 3/5027 435/287.1 |
| 2012/0085648 | A1 * | 4/2012 | Kartalov | A61M 1/3496 210/806 |
| 2014/0220668 | A1 * | 8/2014 | Tachibana | B01L 7/52 435/303.1 |
| 2015/0352552 | A1 | 12/2015 | Levenberg et al. | |
| 2017/0130261 | A1 | 5/2017 | Nagai et al. | |
| 2018/0274019 | A1 | 9/2018 | Fukuzawa et al. | |
| 2018/0311673 | A1 | 11/2018 | Fukuzawa et al. | |
| 2018/0372767 | A1 | 12/2018 | Takeuchi et al. | |
| 2019/0099759 | A1 | 4/2019 | Fukuzawa | |
| 2019/0255525 | A1 | 8/2019 | Fukuzawa | |
| 2020/0157607 | A1 | 5/2020 | Nagai et al. | |

FOREIGN PATENT DOCUMENTS

| | | | | |
|---|---|---|---|---|
| JP | 6226284 | B2 | 11/2017 | |
| JP | 2018-019606 | A | 2/2018 | |
| WO | WO 2017/086199 | A1 | 5/2017 | |
| WO | WO-2017094674 | A1 * | 6/2017 | B01L 3/502 |
| WO | WO 2017/119382 | A1 | 7/2017 | |
| WO | WO 2017/199933 | A1 | 11/2017 | |
| WO | WO 2018/084017 | A1 | 5/2018 | |

OTHER PUBLICATIONS

European Patent Office, Extended European Search Report in European Patent Application No. 19855889.2 (Apr. 28, 2022).
China National Intellectual Property Administration, Office Action in Chinese Patent Application No. 201980055299.1 (Jun. 28, 2024).

* cited by examiner (a)

(b)

SEQUENCE LISTING

```
<160> NUMBER OF SEQ ID NOS: 3

<210> SEQ ID NO 1
<211> LENGTH: 22
<212> TYPE: DNA
<213> ORGANISM: Artificial Sequence
<220> FEATURE:
<223> OTHER INFORMATION: Primer

<400> SEQUENCE: 1

gtgtgatatc tacccgcttc gc                                              22


<210> SEQ ID NO 2
<211> LENGTH: 24
<212> TYPE: DNA
<213> ORGANISM: Artificial Sequence
<220> FEATURE:
<223> OTHER INFORMATION: Primer

<400> SEQUENCE: 2

agaacggttt gtggttaatc agga                                            24


<210> SEQ ID NO 3
<211> LENGTH: 22
<212> TYPE: DNA
<213> ORGANISM: Artificial Sequence
<220> FEATURE:
<223> OTHER INFORMATION: Probe

<400> SEQUENCE: 3

tcggcatccg gtcagtggca gt                                              22
```

PCR REACTION CONTAINER

CROSS-REFERENCE TO RELATED APPLICATIONS

This patent application is the U.S. national phase of International Patent Application No. PCT/JP2019/034008, filed Aug. 29, 2019, which claims the benefit of Japanese Patent Application No. 2018-161316, filed on Aug. 30, 2018, which are incorporated by reference in their entireties herein.

INCORPORATION-BY-REFERENCE OF MATERIAL ELECTRONICALLY SUBMITTED

Incorporated by reference in its entirety herein is a computer-readable nucleotide/amino acid sequence listing submitted concurrently herewith and identified as follows: 875 bytes ASCII (Text) file named "753042SequenceListing.txt," created Feb. 23, 2021.

TECHNICAL FIELD

The present invention relates to a PCR vessel for use in a polymerase chain reaction (PCR), and a PCR device and a PCR method both using the PCR vessel.

BACKGROUND ART

Thermal cyclers for general-purpose PCR and real-time PCR take a long time to change temperature due to their huge heat capacity, and require 1 to 2 hours for the PCR. The present inventors have already developed a method for accelerating thermal cycling by repeating liquid delivery over multiple temperature zones using microchannel chips (PTL 1). Further, the present inventors have proposed a mechanism that does not require weighing and prevents liquid leakage using a structure that combines, as sample introduction parts, branch flow channels along a plane constituting a PCR vessel (PTL 2).

In the technique proposed in PTL 2, some residual sample droplets remained in the branch flow channel parts at the time of sample introduction, which possibly caused a phenomenon in which the residual droplets accidentally entered the main flow channel, interfering with liquid delivery in the subsequent thermal cycle by reciprocating liquid delivery.

PTL 3 discloses a technique in which after the temperature of a dispensation region is increased by a heater to a temperature higher than room temperature, a sample is moved to a thermal cycle region, and then the temperature of the dispensation region is decreased to cool and contract the air, thereby retracting droplets remaining in the dispensation region from the main flow channel.

CITATION LIST

Patent Literature

PTL 1: JP6226284B

PTL 2: WO2017/094674

PTL 3: JP2018-19606A

SUMMARY OF INVENTION

Technical Problem

An object of the present invention is to provide a PCR vessel in which even if sample droplets remain, no problems arise in terms of liquid delivery in the main flow channel during the thermal cycle.

Solution to Problem

The present invention provides the following PCR vessel.

[1]

A PCR vessel having:

a substrate, a flow channel formed in the substrate, a pair of filters provided at both ends of the flow channel, a pair of air communication ports communicating with the flow channel through the filters, a thermal cycle region formed between the pair of filters in the flow channel, and a sample injection port through which a sample can be injected into the flow channel from above;

wherein the sample injection port in the surface of the substrate has an area of 0.7 to 1.8 $mm^2$.

[2]

The reaction container according to [1], wherein the sample injection port is circular, elliptical, or polygonal.

[3]

The reaction container according to [1] or [2], wherein the flow channel has a width of 300 to 1000 μm.

[4]

The reaction container according to any one of [1] to [3], wherein an end of a sample injection member having a circular or polygonal tubular shape separately used for sample injection reaches the inside of the flow channel,

[5]

The reaction container according to any one of [1] to [4], wherein the sample injection port has a volume of 7.5 μl or less, which is a space between the substrate surface and the flow 15 channel.

[6]

The reaction container according to any one of [1] to [5], wherein after sample injection, an upper opening of the sample injection port is sealed with a seal, the sample injection member, or the like.

[7]

The reaction container according to any one of [1] to [6], which has a thickness of 3 to 5 mm.

Advantageous Effects of Invention

In the present invention, a sample injection port is provided on the flow channel, without mediating a branch flow channel as in the prior art. Injection of a sample through a branch flow channel has caused a problem in that the sample remains in the branch flow channel and the remaining sample enters the main flow channel during the thermal cycle. However, when a sample injection port is provided on the flow channel, the sample remaining in the space of the sample injection port on the flow channel is retained in the space even during the thermal cycle. Accordingly, it is not necessary to use a heater as described in PTL 3.

DESCRIPTION OF EMBODIMENTS

Figure 1:
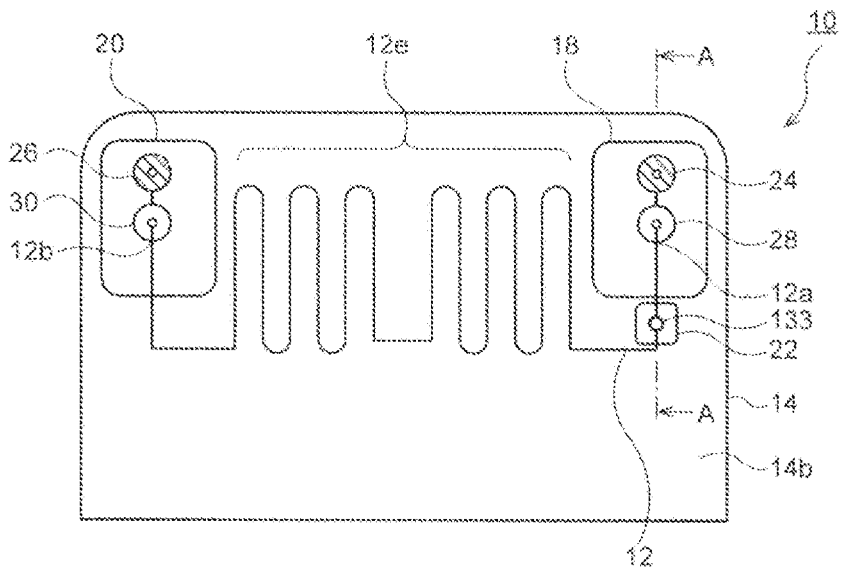
FIGS. 1(*a*) and (*b*) are diagrams for explaining the PCR vessel according to the first embodiment of the present invention.
Figure 1:
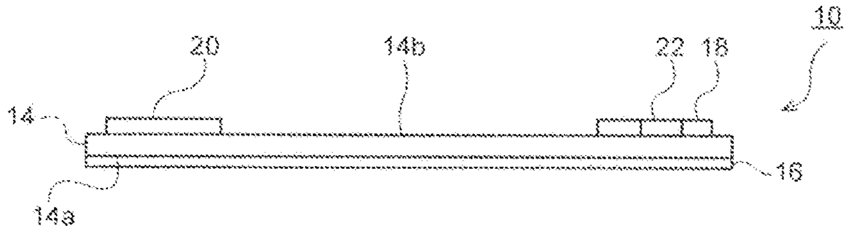
Figure 2:
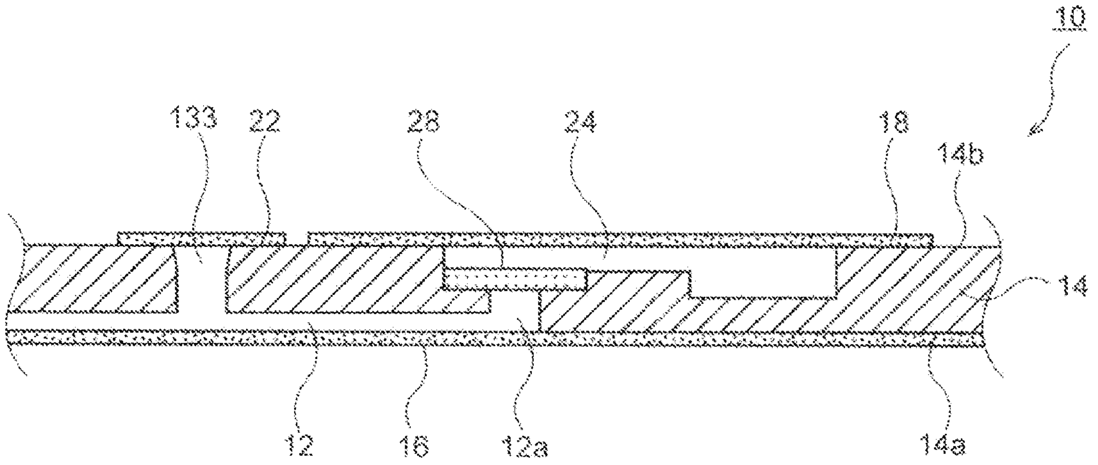
FIG. 2 is the A-A cross-sectional view of the PCR vessel shown in FIG. 1(*a*).
Figure 3:
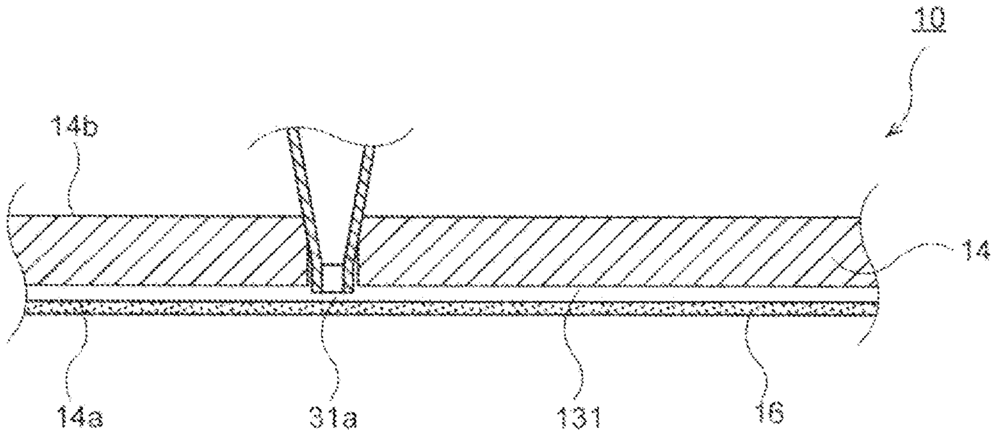
FIG. 3 is a cross-sectional view showing a sample injection port.

The PCR vessel and PCR device according to the embodiments of the present invention are described below. The same or equivalent components, members, and treatments shown in the drawings are designated by the same reference numerals, and duplicate descriptions are omitted as appropriate. The embodiments do not limit the invention, but are merely examples. Not all of the features and combinations thereof described in the embodiments are essential to the invention. The PCR vessel of the present invention can be used as a chip for nucleic acid amplification, FIGS. 1(*a*) and 1 (*b*) are diagrams for explaining the PCR vessel 10 according to the first embodiment of the present invention. FIG. 1(*a*) is a plan view of the PCR vessel 10, and FIG. 1(*b*) is a front view of the PCR vessel 10. FIG. 2 is the A-A cross-sectional view of the PCR vessel shown in FIG. 1(*a*). FIG. 3 shows a state in which a disposable tip of a pipette is inserted into a sample injection port.

The PCR vessel 10 comprises a resin substrate 14 with a lower surface 14*a* having a groove-like flow channel 12, a flow channel sealing film 16 for sealing the flow channel 12 attached to the lower surface 14*a* of the substrate 14, and three sealing films (a first sealing film 18, a second sealing film 20, and a third sealing film 22) attached to an upper surface 14*b* of the substrate 14.

The substrate 14 is preferably made of a material that has good thermal conductivity, is stable against temperature changes, and is not easily affected by a sample solution to be used. Further, the substrate 14 is preferably made of a material that has good moldability, excellent transparency and barrier properties, and low autofluorescence. Such materials are preferably inorganic materials such as glass and silicon, and resins such as acrylic, polyester, and silicone; and particularly preferably cycloolefins. The size of the substrate 14 is, for example, 70 mm on the long side, 42 mm on the short side, and 3 mm in thickness. The size of the flow channel 12 formed in the lower surface 14*a* of the substrate 14 is, for example, 0.5 mm in width and 0.5 mm in depth.

The groove-like flow channel 12 is formed in the lower surface 14*a* of the substrate 14, and the flow channel 12 is sealed with the flow channel sealing film 16 (see FIG. 2). A first air communication port 24 is formed at one end 12*a* of the flow channel 12 in the substrate 14. A second air communication port 26 is formed at the other end 12*b* of the flow channel 12 in the substrate 14. The pair of first air communication port 24 and second air communication port 26 are formed so as to be exposed on the upper surface 14*b* of the substrate 14. Such a substrate can be produced by injection molding or by cutting with an NC processing machine etc. The width of the flow channel is preferably 300 to 1000 μm. The depth of the flow channel is preferably 300 to 1000 μm.

A first filter 28 is provided between the first air communication port 24 and one end 12*a* of the flow channel 12 in the substrate 14 (see FIG. 2). A second filter 30 is provided between the second air communication port 26 and the other end 12*b* of the flow channel 12 in the substrate 14. The pair of first filter 28 and second filter 30 provided at both ends of the flow channel 12 have sufficiently low impurity characteristics, allow only the air to pass through, and prevent contamination so that the quality of DNA amplified by PCR does not deteriorate. The filter material is preferably polyethylene, PTFE, or the like, and may be porous or hydrophobic. The first filter 28 and the second filter 30 are each formed into a size that fits tightly in the filter installation space formed in the substrate 14.

The substrate 14 is provided with a sample injection port 133 between the first filter 28 and a thermal cycle region 12*e*, or between the second filter 30 and the thermal cycle region 12*e*. The sample injection port 133 is formed so as to be exposed on the upper surface 14*b* of the substrate 14.

The thermal cycle region 12*e*, in which a high-temperature region and a medium-temperature region are planned, is formed between the first filter 28 and the second filter 30 in the flow channel 12 to apply a thermal cycle to the sample. The thermal cycle region 12*e* of the flow channel 12 includes a serpentine flow channel. This is to efficiently apply the amount of heat given by the PCR device in the PCR step to the sample, and to allow a predetermined volume or more (e.g., 25 μL or more) of sample to be subjected to PCR. Since the PCR vessel 10 is planned to be installed in a PCR device, to apply a thermal cycle to the sample, and to measure the optical property values, such as fluorescence emitted from the sample, the arrangement of the elements, such as the flow channel and branch point, may be freely selected in consideration of the arrangement of a temperature control unit and a fluorescence detection probe described later.

In the PCR vessel 10 according to the first embodiment, most of the flow channel 12 is formed in a groove shape exposed on the lower surface 14*a* of the substrate 14. This is to facilitate molding by injection molding using a mold or the like. In order to utilize this groove as a flow channel, the flow channel sealing film 16 is attached to the lower surface 14*a* of the substrate 14. One main surface of the flow channel sealing film 16 may have stickiness, or a functional layer that exerts stickiness or adhesiveness when pressed may be formed on one main surface. This film has a function capable of being easily integrated with the lower surface 14*a* of the substrate 14. The flow channel sealing film 16 is desirably made of a material having low autofluorescence, including an adhesive. In this respect, a transparent film made of a resin, such as a cycloolefin polymer, polyester, polypropylene, polyethylene, or acrylic, is suitable, but is not limited thereto. Further, the flow channel sealing film 16 may be made of plate-like glass or resin. In this case, rigid properties can be expected, which helps prevent the warpage and deformation of the PCR vessel 10.

Moreover, in the PCR vessel 10 according to the first embodiment, the first air communication port 24, the second air communication port 26, the first filter 28, the second filter 30, and the sample injection port 133 are exposed on the upper surface 14*b* of the substrate 14. In order to seal the first air communication port 24 and the first filter 28, the first sealing film 18 is attached to the upper surface 14*b* of the substrate 14, In order to seal the second air communication port 26 and the second filter 30, the second sealing film 20 is attached to the upper surface 14*b* of the substrate 14. In order to seal the sample injection port 133, the third sealing film 22 is attached to the upper surface 14*b* of the substrate 14.

The first sealing film 18 used has a size that can simultaneously seal the first air communication port 24 and the first filter 28, and the second sealing film 20 used has a size that can simultaneously seal the second air communication port 26 and the second filter 30. A pressurized pumps (described later) are connected to the first air communication port 24 and the second air communication port 26 by perforating the first air communication port 24 and the second air communication port 26 with hollow needles (injection needles with a sharp tip) provided at the end of the pumps. Therefore, the first sealing film 18 and the second sealing film 20 are preferably films made of a material with a thickness that can be easily perforated with a needle. The first embodiment describes a sealing film having a size that can simultaneously seal the corresponding air communication port and filter; however, they may be sealed separately. Alternatively, a sealing film that can seal the first air communication port 24, the first filter 28, the second air communication port 26, and the second filter 30 all at once (a single film) may also be used.

The third sealing film 22 used has a size that can seal the sample injection port 133. The injection of the sample into the flow channel 12 through the sample injection port 133 is performed in such a manner that the third sealing film 22 is once removed from the substrate 14, and after a predetermined amount of sample is injected, the third sealing film 22 is returned and attached again to the upper surface 14*b* of the substrate 14. Therefore, the third sealing film 22 is desirably a film having stickiness that can withstand several cycles of attachment and removal. Further, the third sealing film 22 may be used in such manner that a new film is attached after the sample is injected. In this case, the importance of the attachment and removal properties can be alleviated.

At the time of sample injection, it is necessary to once remove either the first sealing film 18 or the second sealing film 20 in the same manner as the third sealing film 22. This is because the sample cannot enter the flow channel unless an air outlet is created. Therefore, the first sealing film 18 and the second sealing film 20 are also desirably films having stickiness that can withstand several cycles of attachment and removal. Alternatively, a new film may be attached after the sample is injected.

It is also possible to provide an air outlet separately from the air communication ports 24 and 26, and to inject the sample into the flow channel by attaching and removing a fourth sealing film.

In the first sealing film 18, the second sealing film 20, and the third sealing film 22, an adhesive layer may be formed on one main surface thereof, or a functional layer that exerts stickiness or adhesiveness when pressed may be formed, as with the flow channel sealing film 16. The first sealing film 18, the second sealing film 20, and the third sealing film 22 are each desirably made of a material having low autofluorescence, including an adhesive. In this respect, a transparent film made of a resin, such as a cycloolefin, polyester, polypropylene, polyethylene, or acrylic, is suitable, but is not limited thereto. As described above, it is desirable that the stickiness and other characteristics do not deteriorate to the extent that the use is affected, even after multiple times of attachment and removal. If a new film is attached after removing the film and injecting a sample or the like, the importance of the attachment and removal properties can be alleviated.

Next, the method of using the PCR vessel 10 configured as described above is explained. First, a sample to be amplified by thermal cycling is prepared. Examples of the sample include those obtained by adding, as PCR reagents, several types of primers, thermostable enzyme, and four types of deoxyribonucleoside triphosphates (dATP, dCTP, dGTP, and dTTP) to a mixture containing two or more types of DNA. Then, the first sealing film 18 and the third sealing film 22 are removed from the substrate 14 to open the first air communication port 24 and the sample injection port 133. When the first sealing film 18 is sized to simultaneously seal the first air communication port 24 and the first filter 28, the first sealing film 18 may be completely removed from the substrate 14 to open the first air communication port 24 and the first filter 28 to the atmosphere; however, by opening only the first air communication port 24 without completely removing the first sealing film 18 from the substrate 14, the first filter 28 is not exposed to the atmosphere, which is effective in preventing contamination. Further, when sealing films that can separately seal the first air communication port 24 and the first filter 28 are used, the first filter 28 is also not exposed to the atmosphere, which is effective in preventing contamination, Next, the sample is injected into the sample injection port 133 from an elongated conical disposable tip (sample injection member) attached to the end of a micropipette. The micropipette allows a fixed amount of the sample to be injected into the flow channel 12 from the disposable tip. A fixed amount of the sample can be ejected from the micropipette by pushing its push button down to the first stop. The entire sample remaining in the disposable tip may be ejected by pushing the push button, which has been stopped once at the first stop, even harder to the second stop. The elongated disposable tip is inserted directly downward toward the flow channel 12 from the upper part of the sample injection port 133, and fixed by abutting on the uppermost part of the sample injection port at any position on the pipette attachment side of the tip, from which the sample is injected. If the diameter of the uppermost part of the sample injection port is too large, the end of the disposable pipette reaches the flow channel; it is not preferable to inject a liquid sample in this state because the sample overflows to the outside without entering the flow channel. If the diameter of the uppermost part of the sample injection port is too small, the end of the disposable tip is only slightly inserted into the sample injection port, and in this state, the sample overflows from the injection port. Accordingly, there is an optimum range for the size of the sample injection port. The size of the sample injection port is preferably about 1 to 1.5 mm in diameter when the injection port is cylindrical.

When a sample is injected from a disposable pipette attached to the end of a micropipette through a sample injection port with an appropriate diameter, the entire sample in the disposable tip can be ejected and pushed into the flow channel by pressing the push button hard to the second stop.

On the other hand, if the push button of the micropipette is pushed down only to the first stop, the liquid sample may remain in the space of the sample injection port 133 on the flow channel 12. It is conceivable that the liquid sample in the space of the sample injection port 133 flows into the flow channel 12 according to gravity in the process of thermal cycling. However, in actuality, the amount of liquid sample in the space of the sample injection port 133 is the same before and after the thermal cycle, and the liquid sample in this space does not adversely affect PCR.

Therefore, the reaction container of the present invention allows PCR, regardless of the injection method of the user.

In order to thus perform PCR without adverse effects, the area of the sample injection port 133 (the area of the opening in the surface of the substrate) is preferably 0.7 to 1.8 $mm^2$, more preferably 0.9 to 1.7 $mm^2$, and particularly preferably 1.3 to 1.6 $mm^2$. The upper limit of the area of the sample injection port 133 is preferably 1.8 $mm^2$ or less, more preferably 1.7 $mm^2$ or less, even more preferably 1.6 $mm^2$ or less, still even more preferably 1.5 $mm^2$ or less, and further still even more preferably 1.4 $mm^2$ or less. The lower limit of the area of the sample injection port 133 is preferably 0.7 $mm^2$ or more, more preferably 0.9 $mm^2$ or more, even more preferably 1.0 $mm^2$ or more, and still even more preferably 1.3 $mm^2$ or more.

Moreover, the volume of the sample injection port (space between the substrate surface and the flow channel) is preferably 7.5 μL or less, and more preferably 3 to 7.5 μL.

The shape of the sample injection port is not particularly limited, but is preferably circular, elliptical, or polygonal tubular, and particularly preferably circular tubular.

Next, the first sealing film 18 and the third sealing film 22 are attached back to the substrate 14 again to seal the first air communication port 24 and the sample injection port 133, respectively. As described above, a new first sealing film 18 and a new third sealing film 22 may be attached. In this manner, the injection of the sample 70 into the PCR vessel 10 is completed. After the sample is injected, a predetermined number of times of PCR thermal cycling can be performed according to a conventional method, and the amplified DNA can be detected by fluorescence or the like.

EXAMPLES

The present invention is described below based on Examples; however, the present invention is not limited to these Examples.

Example 1

1. For the PCR device used, a reciprocating liquid delivery PCR vessel (thickness: 4 mm) having one flow channel for alternately delivering a PCR reagent over two temperature zones so that high-speed thermal cycling was possible was used.

2. A through-hole was formed from the upper surface of a resin substrate of the PCR vessel using a drill with a diameter of 0.9 to 1.6 mm so as to be orthogonal to the central axis of the flow channel formed in the substrate to produce a reagent injection port. After removing excess burrs and dirt, all sealing films, including a flow channel sealing film, were joined, and subsequent PCR verification was performed.

3. The POR reagent was prepared as shown below.

TABLE 1

| | |
|---|---|
| SpeedSTAR. polymerase | 0.5 μL |
| 10 × FB buffer | 2.5 μL |
| dNTP mix (2.5 mM) | 2.0 μL |
| Primer mix (custom DNA primer) | 3.0 μL |
| 5'-GTGTGATATCTACCCGCTTCGC-3' | |
| 5'-AGAACGGTTTGTGGTTAATCAGGA-3' | |
| Probe (custom DNA primer, FAM-TAMRA-labeled) | 1.0 μL |
| 5'-(FAM)-TCGGCATCCGGTCAGTGGCAGT-(TAMRA)-3' | |
| uidA gene PCR product ($10^6$ copies/μL) | 1.0 μL |
| $H_2O$ | 15 μL |
| Total | 25 μL |

4. 20 μl of the prepared PCR reagent was aspirated with a micropipette equipped with a disposable pipette tip (using Molecular BioProducts ART 100E (100 μL)). With the end of the pipette tip inserted into the reagent injection port, the entire amount of PCR reagent aspirated was injected into the flow channel of the PCR vessel, 5. When a PCR reagent is ejected from a micropipette, the ejected solution is usually cut off at the end position of the disposable pipette tip. Therefore, it is conceivable that the end position of the pipette tip does not completely reach the inside of the flow channel and stays in the reagent injection port due to the relationship with the diameter of the reagent injection port. In this case, the back end of the plug-like PCR reagent injected into the flow channel stays in the reagent injection port, and a part of the PCR reagent remains in the reagent injection port during liquid delivery in the subsequent PCR.

6. On the other hand, when the PCR reagent is injected, the entire amount of PCR reagent aspirated is ejected by pushing an excessive volume of the micropipette, and then air is continuously pushed out into the flow channel, whereby the PCR reagent, including the plug back end, can be completely injected into the flow channel. Thus, the condition for completely pushing the entire amount of PCR reagent into the flow channel using a micropipette is expressed as "with pushing in of the reagent." On the other hand, the case in which the PCR reagent is not pushed into the flow channel by general micropipette operation is hereinafter referred to as "without pushing in of the reagent."

7. The PCR vessel, in which the PCR reagent was injected and sealed with a sealing film, was mounted in a device incorporating temperature zones of 98° C. and 61° C., pumps for reciprocating liquid delivery, and a fluorescence detector for quantifying the amplified DNA in the flow channel, and real-time PCR was performed. The PCR conditions were as follows.

| | | |
|---|---|---|
| 98° C. | 10 s | |
| 98° C. | 3 s | 40 cycles |
| 61° C. | 5 s | |

Results and Discussion

1. Table 2 summarizes the positions reached by the end of the pipette tip when the pipette tip was inserted into the sample injection port.

TABLE 2

| Drill diameter (mm) | Position of the end of the pipette tip |
|---|---|
| 0.9 | Did not enter the sample injection port |
| 1.0 | Upper edge of the sample injection port |
| 1.1 | In the sample injection port |
| 1.2 | In the sample injection port |
| 1.3 | In the sample injection port |
| 1.4 | Near the height of the flow channel |
| 1.5 | Reached the inside of the flow channel |
| 1.6 | Reached the flow channel sealing film |

2. Table 3 summarizes the liquid height of the back end of the plug-like PCR reagent in the reagent injection port before PCR in the pattern without pushing in of the reagent.

TABLE 3

| Drill diameter (mm) | Liquid height of the reagent in the injection port |
|---|---|
| 0.9 | PCR reagent could not be injected |
| 1.0 | Near the entrance of the reagent injection port |
| 1.1 | Near the entrance of the reagent injection port |
| 1.2 | Approximately 60% of the height in the reagent injection port |
| 1.3 | Approximately 50% of the height in the reagent injection port |
| 1.4 | Approximately 30% of the height in the reagent injection port |
| 1.5 | Approximately 10% of the height in the reagent injection port |
| 1.6 | PCR reagent overflowed without entering the flow channel |

3. The pipette tip could not be inserted into the sample injection port with a diameter of 0.9 mm, and the PCR reagent thus could not be injected. On the other hand, the sample injection port with a diameter of 1.6 mm was larger in diameter than the end of the pipette tip; therefore, the PCR reagent overflowed from the upper part of the sample injection port and could not be injected.

4. It was thus found that the PCR reagent could not be injected and overflowed when the pipette tip could not be inserted into the reagent injection port, or when the diameter of the injection port was larger than that of the pipette tip end.

5. When the diameter of the reagent injection port was 1.5 mm, the end of the pipette tip reached the inside of the flow channel; however, when the reagent was not pushed in, the back end of the plug-like PCR reagent entered the reagent injection port. This is considered to be because the pipette tip was pulled back when it was withdrawn after reagent injection.

Figure 4:
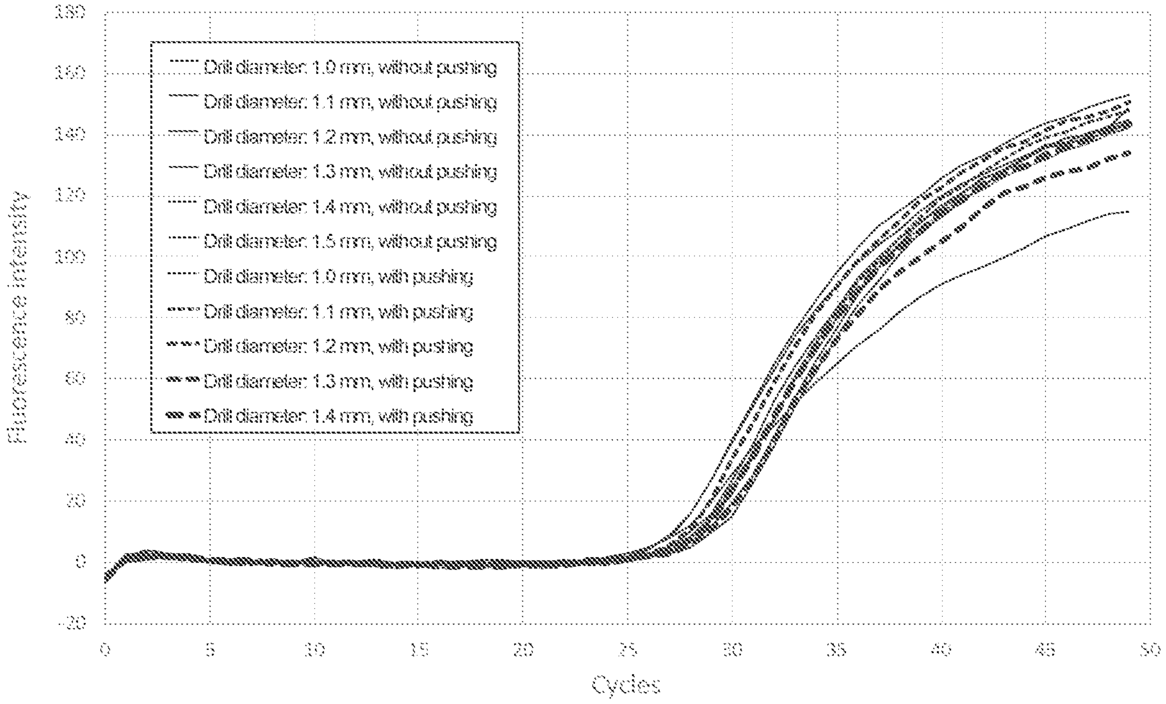
FIG. 4 shows the results of high-speed PCR using *E. coli* uidA.

6. Next, FIG. 4 shows the amplification curves of the results of real-time PCR.

7. The difference in Ct values of about 2 cycles was within the uncertainty range derived from the measuring device; and no significant difference was confirmed.

8. Based on the above results, Table 4 summarizes the evaluation of whether reagent injection and PCR were possible for each drill size used to form the reagent injection port.

TABLE 4

| Drill diameter | Without pushing in of the reagent | | With pushing in of the reagent | |
|---|---|---|---|---|
| (mm) | Reagent injection | PCR | Reagent injection | PCR |
| 0.9 | X | — | X | — |
| 1.0 | ○ | ○ | ○ | ○ |
| 1.1 | ○ | ○ | ○ | ○ |
| 1.2 | ○ | ○ | ○ | ○ |
| 1.3 | ○ | ○ | ○ | ○ |
| 1.4 | ○ | ○ | ○ | ○ |
| 1.5 | ○ | ○ | X | — |
| 1.6 | X | — | X | — |

9. When the PCR reagent was pushed in with a pipette in the reagent injection port with a diameter of 1.5 mm, leakage occurred from the inlet of the sample injection port due to the pressure of the micropipette, and the sample could not be injected normally, 10. However, under any conditions in which the PCR reagent could be injected normally, real-time PCR was possible normally, as shown in FIG. 4, without affecting the PCR liquid delivery.

11. Table 5 summarizes the amount of liquid remaining in the sample injection port after PCR. The amount of reagent remaining in the reagent injection port showed almost no change before and after PCR.

TABLE 5

| Drill diameter (mm) | Amount of liquid remaining in the reagent injection port after PCR |
|---|---|
| 0.9 | — |
| 1.0 | Approximately 60% of the height in the reagent injection port |
| 1.1 | Near the entrance of the reagent injection port |
| 1.2 | Approximately 60% of the height in the reagent injection port |
| 1.3 | Approximately 50% of the height in the reagent injection port |
| 1.4 | Approximately 30% of the height in the reagent injection port |
| 1.5 | Approximately 10% of the height in the reagent injection port |
| 1.6 | — |

12. As described above, when a solution was directly injected through a sample injection port without providing a branch flow channel as in this Example, instead of injecting the sample through a branch flow channel, it was expected that if a part of the solution remained in the reagent injection port located above the flow channel, it would leak out due to gravity during liquid delivery, blocking the flow channel and hindering normal reciprocating liquid delivery; however, it was confirmed that PCR liquid delivery was possible normally without leakage from the sample injection port,

REFERENCE SIGNS LIST

10. PCR vessel
12. Flow channel
14. Substrate
16. Flow channel sealing film
18. First sealing film
20. Second sealing film
22. Third sealing film
24. First air communication port
26. Second air communication port
28. First filter
30. Second filter
133. Sample injection port

INDUSTRIAL APPLICABILITY

The PCR device achieved by the present invention realizes rapid testing and is useful as equipment for initial response to pandemics, such as highly pathogenic influenza. Further, this PCR device can not only be applied to genetic testing technology for tailor-made medicine based on genetic information, but also quickly determine the effect of treatment by quantitative PCR in clinical practice. Therefore, its market advantage is strong particularly in the medical field.

The invention claimed is:

1. A PCR vessel comprising:
   - a substrate comprising a surface,
   - a flow channel formed in the substrate,
   - a pair of filters provided at both ends of the flow channel,
   - a pair of air communication ports communicating with the flow channel through the filters,
   - a thermal cycle region that is in the flow channel between the pair of filters where heat is applied, and
   - a sample injection port formed to connect the surface of the substrate and the flow channel through which a sample can be injected into the flow channel between one of the filters and the thermal cycle region, without mediating a branch flow channel, wherein the sample injection port in the surface of the substrate has an area of 0.7 $mm^2$ to 1.8 $mm^2$.

2. The PCR vessel according to claim 1, wherein the sample injection port is circular, elliptical, or polygonal.

3. The PCR vessel according to claim 1, wherein the flow channel has a width of 300 μm to 1000 μm.

4. The PCR vessel according to claim 1, wherein a sample can be injected into the flow channel using a sample injection member that is separate from the PCR vessel and that has a circular or polygonal tubular shape in which an end of the sample injection member reaches the inside of the flow channel.

5. The PCR vessel according to claim 1, wherein the sample injection port has a volume of 7.5 μL or less, which is a space between the surface of the substrate and the flow channel.

6. The PCR vessel according to claim 1, wherein after sample injection, an upper opening of the sample injection port can be sealed with a sample injection member that is separate from the PCR vessel.

7. The PCR vessel according to claim 1, which has a thickness of 3 mm to 5 mm.

8. The PCR vessel according to claim 2, wherein the flow channel has a width of 300 μm to 1000 μm.

9. The PCR vessel according to claim 8, wherein a sample can be injected into the flow channel using a sample injection member that is separate from the PCR vessel and that has a circular or polygonal tubular shape in which an end of the sample injection member reaches the inside of the flow channel.

10. The PCR vessel according to claim 9, wherein the sample injection port has a volume of 7.5 μL or less, which is a space between the surface of the substrate and the flow channel.

11. The PCR vessel according to claim 10, wherein the substrate has a thickness of 3 mm to 5 mm.

12. The PCR vessel according to claim 1, wherein the PCR vessel further comprises a seal attached to the substrate, and wherein an upper opening of the sample injection port can be sealed with the seal after sample injection.

13. The PCR vessel according to claim 10, wherein the PCR vessel further comprises a seal attached to the substrate, and wherein an upper opening of the sample injection port can be sealed with the seal after sample injection.

14. The PCR vessel according to claim 13, wherein the substrate has a thickness of 3 mm to 5 mm.

* * * * *